United States Patent Office 3,327,198
Patented June 20, 1967

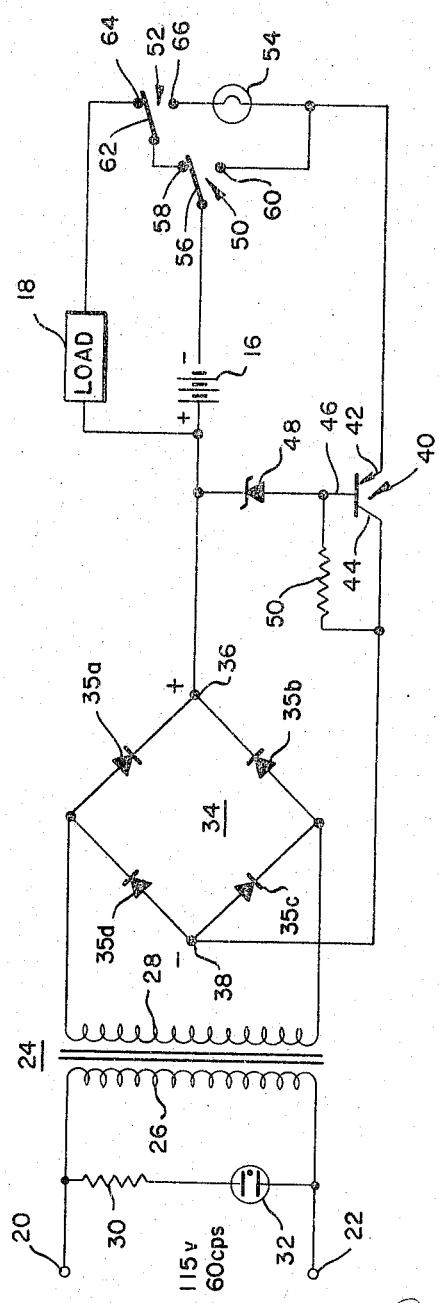

3,327,198
BATTERY CHARGING SYSTEM AND INDICATOR
Morris Rauch, Seaford, N.Y., assignor to Benjamin Electronic Sound Corporation, Westbury, N.Y., a corporation of New York
Filed Dec. 15, 1964, Ser. No. 418,443
1 Claim. (Cl. 320—14)

The present invention relates to battery charging apparatus, and, in particular, to a battery charger wherein an inexpensive indicating means is employed to indicate what the relative state of charge of the battery would be under actual closed circuit conditions.

Today, battery powered electrical appliances have gained wide-spread popularity. Many of these appliances are powered by rechargeable batteries or accumulators, and numerous devices have been proposed for the purpose of recharging such batteries from the conventional AC outlets available in most homes.

When recharging an alkaline or lead acid battery, it is important to control the charging current, since overcharging may result in permanent damage to the battery. For this purpose most commercially available battery chargers include a state of charge indicator which, as its name implies, manifests the relative charge of the battery. Prior art indicators normally comprise a voltmeter which may be switched across the terminals of the battery.

Besides the considerable expense of a meter, the known devices only measure the no-load voltage across the battery. This is a significant drawback, because the voltage across a battery may vary considerably between load and no-load conditions due to the internal resistance of the battery. Thus a voltmeter may indicate that the no-load voltage across the battery is sufficient, when, in fact, the battery is not fully charged and under load conditions will behave accordingly.

Therefore, the main object of the present invention is to provide an improved, inexpensive battery charger wherein the state of charge of a battery under closed circuit conditions may be determined.

Another object of the invention is to provide a battery charger including an inexpensive device for indicating the state of charge of a battery as a function of the charging current, and means for removing the indicating device from the circuit during the actual charging operation.

Briefly, in accordance with the invention, a series regulator circuit is connected to a switching means capable of connecting the battery to the load (such as a television set), or the regulator circuit. The regulator controls the charging current as a function of the voltage across the battery, whereby the charging current decreases to a minimum when the battery is fully charged. The state of charge indicator comprises a lamp which, through operation of the switching circuit, may be temporarily connected in series with the regulator and battery to indicate the magnitude of the charging current, and thus the relative state of charge of the battery, by its glow intensity. The switching means is further operable during the actual charging cycle of the battery to remove the resistance of the lamp from the charging circuit.

The manner in which the above and other objects of the invention are accomplished is more fully described below with reference to the attached drawing, which is a schematic diagram of a preferred embodiment of the invention.

Referring to the drawing, the battery to be charged is indicated generally at 16, and the load which is powered by the battery is illustrated at 18. By way of example only, load 18 may comprise a television set, in which case battery 16 might be a fifteen volt alkaline battery.

The charging circuit of the invention includes two connectors 20 and 22 which may be plugged into a conventional wall socket to supply the available alternating voltage to the charger. A step-down transformer 24 is connected across connectors 20 and 22, and includes a primary winding 26 and a secondary winding 28. A high resistance 30 and a neon pilot tube 32 are connected in a series branch across the primary winding 26 to indicate that an alternating voltage has been applied across the primary of the transformer.

The secondary winding 28 of transformer 24 is connected to a conventional full wave rectifier 34 which consists of four suitably poled silicon diodes 35a to 35d. In a known manner, rectifier 34 delivers a direct voltage across output terminals 36 and 38, with terminal 36 positive with respect to terminal 38.

A power transistor 40 is connected to the output terminals 36 and 38 of rectifier 34 to serve as a series regulator during the charging of battery 16. Transistor 40 includes an emitter 42, a collector 44 and a base 46. A zener diode 48 is connected between base 46 and positive terminal 36. Collector 44 is connected directly to negative terminal 38 and a biasing resistor 50 is connected between the collector and base.

According to the invention, a pair of single pole, double-throw switches 50 and 52, together with an indicating lamp 54, are interconnected between the battery 16, load 18, and the charging circuit as so far described. Switch 50 includes a movable armature 56 and stationary terminals 58 and 60. Switch 52 consists of armature 62 and stationary terminals 64 and 66, and, preferably, is a conventional momentary-type switch in which the armature is returned to its initial position (as illustrated) when the actuating force is removed. As explained in detail below, the function of switch 50 is to permit the user to connect battery 16 to the charging circuit or to the load 18 for operation thereof. The function of switch 52 is to place the indicator lamp 54 temporarliy in series with the battery and series regulator, so that the actual charging current can be measured.

It has been assumed that it is desired to charge battery 16 to a voltage of fifteen volts. For this purpose, the breakdown voltage of zener diode 48 should also be fifteen volts, and transformer 24 should reduce the input alternating voltage to approximately seventeen volts at zero charging current (i.e. when the battery is fully charged), which will be equivalent to about fourteen volts at maximum charging current.

With armature 56 contacting terminal 58 and armature 62 contacting terminal 64, as illustrated, the battery 16 is connected directly across the load and the load will operate in a conventional manner. Since the emitter 42 is not returned to a positive voltage because of the positions of armatures 56 and 62, there is no charging current flowing through the series regulating transistor 40.

If it is desired to charge battery 16, armature 56 is thrown into contact with terminal 60. Under these conditions the positive voltage at terminal 36, less the voltage across battery 16, is applied through armature 56 and terminal 60 to emitter 42. If battery 16 is in need of a charge, the voltage across its terminals will be relatively low and there will be a substantial positive voltage on emitter 42. Moreover, if battery 16 is discharged, it will draw so much current from rectifier 34, that insufficient current will flow through zener diode 48 and resistor 50 to permit the diode to operate in its zener region. Nevertheless, the voltage drop across diode 48 will still be sufficient to bias transistor 40 heavily into conduction, whereby charging of the battery commences.

As the battery becomes charged, the voltage across its terminals rises and its resistance to the charging current increases. As a result, the current flow through zener diode 48 is increased until the voltage thereacross reaches the zener level, where it is maintained substantially constant. As the voltage across battery 16 continues to increase, the emitter-base voltage becomes progressively less positive until, finally, when the battery 16 is charged to a voltage equal to the zener voltage of diode 48, the emitter-base voltage becomes insufficient to maintain conduction through transistor 40, and the charging current is cut off. In this manner, the zener diode 48 prevents overcharging of battery 16.

As mentioned above, one of the most significant aspects of the invention is the ability to determine the state of charge of the battery under load conditions by measuring the relative magnitude of the actual charging current being fed to battery 16. For this purpose, switch 52 cooperates with switch 50 to place the indicator lamp 54 temporarily in series with the battery 16 and series regulator transistor 40. To use the indicator, it is necessary to return armature 56 to terminal 58 (the normal operating condition for load 18). The user then moves armature 62 into contact with terminal 66 to complete a series circuit from the negative terminal of battery 16 to emitter 42 through armature 56, terminal 58, armature 62, terminal 66 and lamp 54. The circuit thus made is identical to the charging circuit described above (with armature 56 contacting terminal 60), except that the incandescent lamp 54 is now connected in series in the circuit. Consequently, the actual circuit operation under these conditions is substantially identical to that described above and the current flow through transistor 40 will be determined by the voltage drop across the battery 16.

If the battery is drawing maximum current, the current flow through lamp 54 will cause the lamp to glow brightly, indicating that the battery is fully discharged and requires further charging. On the other hand, if battery 16 is fully charged, the current flow through transistor 40 will be very low (or even cut off) and this small flow of current will be insufficient to light lamp 54. In between these two extremes, lamp 54 will glow with an intensity proportional to the relative voltage across battery 16, so that by observing the brightness of the lamp the user can easily determine whether or not the battery 16 is in need of a charge. When the actuating force is removed from armature 62, it returns to its illustrated position opening the series circuit.

The switching arrangement described enables removal of lamp 54 from the charging circuit during the actual charging operation. This is important because the impedance of the lamp will decrease the charging current and thus tend to materially lengthen the necessary charging cycle. In the present case, during the charging operation armature 56 contacts terminal 60; therefore, lamp 54 is removed from the circuit and can have not effect on the actual charging operation.

Numerous mechanical arrangements of the invention are possible. In a preferred embodiment, the actual charging apparatus is a separate component which, conventionally, may be plugged into the appliance to make the required connections with the battery and load. However, if desired, circuits built in accordance with the invention could be constructed as a permanent part of the actual appliance.

Many other modifications of the invention will also be obvious to those skilled in the art, and the invention should not be limited except as defined by the following claim.

What is claimed is:

A battery charger for charging a battery adapted to be connected to a load, comprising voltage stabilizing means, a step down transformer connected to said voltage stabilizing means, a full wave rectifier connected to the output of said transformer, series regulator means for controlling the charging current applied to said battery as a function of the voltage across the battery, said series regulator comprising a transistor, a zener diode connected in the base circuit of said transistor, the breakdown voltage of said zener diode being substantially equal to the full-charge voltage across said battery, a first switch for selectively connecting said battery to said load or to said series regulator means, an incandescent lamp, a second switch for connecting said battery in series with said incandescent lamp and series regulator to thereby indicate the relative magnitude of the charging current flowing into said battery, said second switch being operable when said first switch connects said battery to said load, actuation of said second switch also interrupting the circuit between said battery and load, said first and second switches comprising single-pole, double-throw switches, each switch including a movable armature and two stationary terminals, the armature of said first switch adapted to be permanently connected to said battery, one terminal of said first switch being permanently connected to the armature of said second switch, one terminal of said second switch adapted to be permanently connected to said load, the other terminal of said first switch being permanently connected to the output of said series regulator, said lamp being permanently connected between the other terminal of said first switch and the other terminal of said second switch.

References Cited

UNITED STATES PATENTS

| | | | |
|---|---|---|---|
| 2,566,969 | 9/1951 | Sorenson | 320—48 X |
| 3,117,269 | 1/1964 | Pensak | 320—40 |
| 3,123,759 | 3/1964 | Grey | 320—40 |
| 3,214,670 | 10/1965 | Schaf | 320—2 |

JOHN F. COUCH, *Primary Examiner.*

S. WEINBERG, *Assistant Examiner.*